Figure 1:
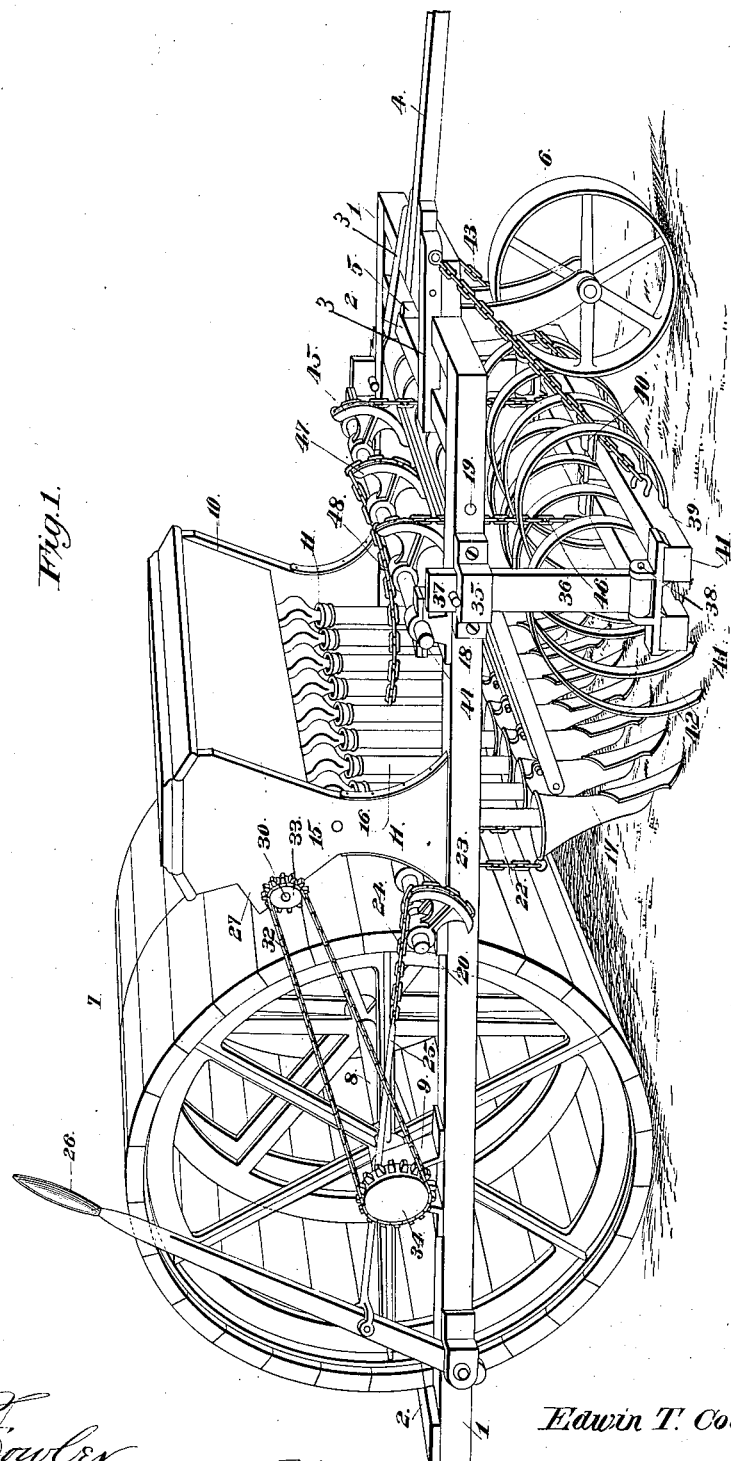

(No Model.) 2 Sheets—Sheet 1.

E. T. COOMBS.
COMBINED HARROW AND ROLLER.

No. 447,763. Patented Mar. 10, 1891.

Witnesses
M. Fowler
Wm. Bagger

Inventor
Edwin T. Coombs
By his Attorneys,
C. A. Snow & Co.

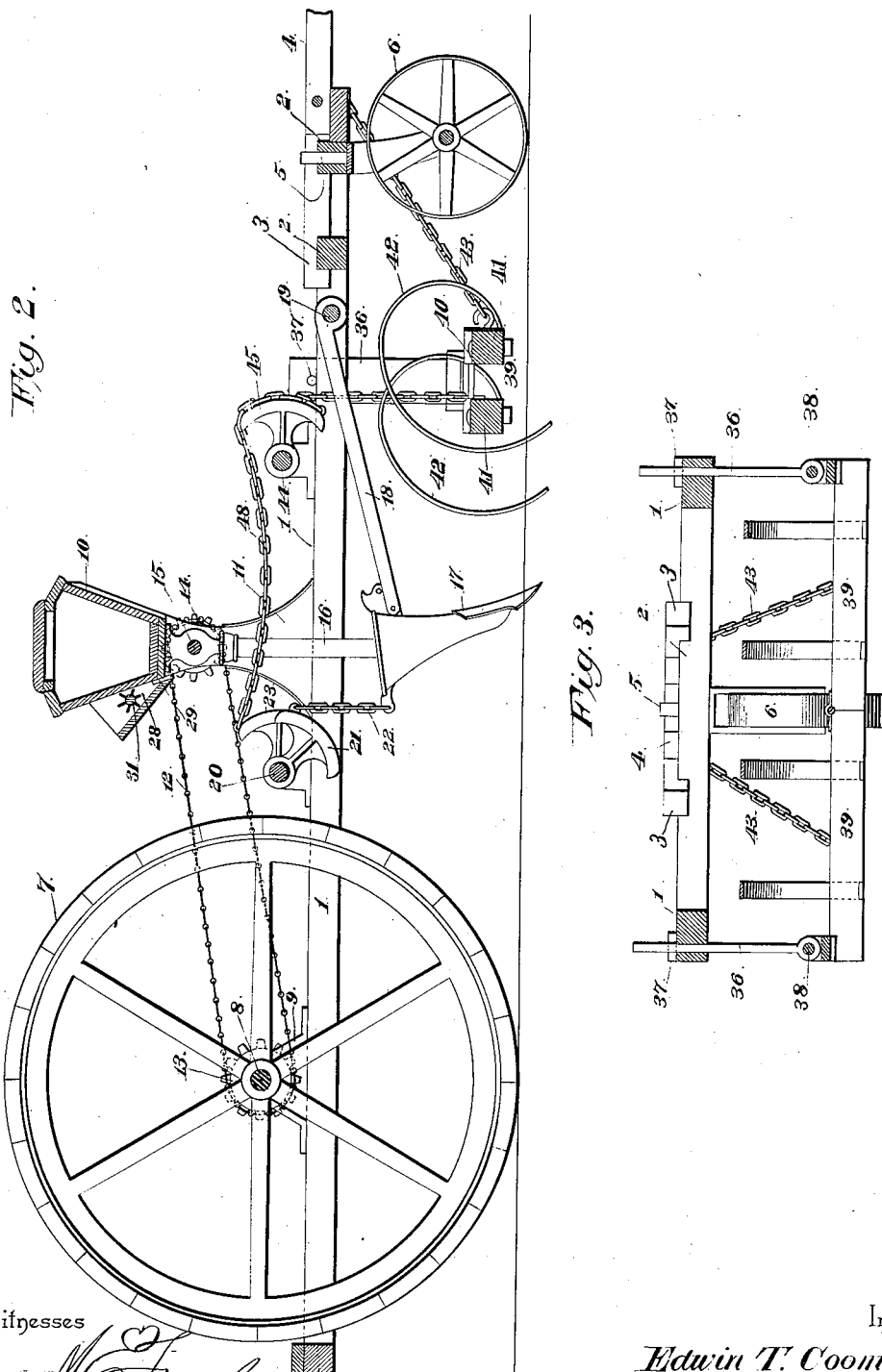

UNITED STATES PATENT OFFICE.

EDWIN T. COOMBS, OF SABINSVILLE, PENNSYLVANIA, ASSIGNOR OF ONE-HALF TO MILFORD H. STEBBINS, MELVIN B. STEBBINS, AND HENRY BAKER, ALL OF SAME PLACE.

COMBINED HARROW AND ROLLER.

SPECIFICATION forming part of Letters Patent No. 447,763, dated March 10, 1891.

Application filed August 15, 1890. Serial No. 362,115. (No model.)

*To all whom it may concern:*

Be it known that I, EDWIN T. COOMBS, a citizen of the United States, residing at Sabinsville, in the county of Tioga and State of Pennsylvania, have invented a new and useful Combined Harrow, Roller, &c., of which the following is a specification.

This invention relates to combined agricultural implements; and it has for its object to construct a machine in which shall be combined a harrow, grain-drill, grass-seeder, and land-roller.

The invention consists in certain improvements in the construction and operation of the parts of the machine, which will be hereafter fully described, and particularly pointed out in the claims.

In the drawings hereto annexed, Figure 1 is a perspective view of a machine embodying my improvements. Fig. 2 is a longitudinal vertical sectional view of the same. Fig. 3 is a transverse sectional view taken through the part of the machine where the harrow is located.

Like numerals of reference indicate like parts in all the figures.

The frame of my improved agricultural implement is rectangular in shape and is composed of the side beams 1 1, connected by the cross-bars 2 2.

3 designates the hound-frame, which is suitably mounted upon the front cross-bars of the main frame, and at the front end of which the tongue 4 is pivotally mounted for the attachment of the draft. The front cross-bar of the frame is provided with suitable bearings for a vertical shaft 5, carrying at its lower end a caster-wheel 6, which supports the front end of the machine. The rear end of the main frame is supported by a roll 7, the shaft or axle of which 8 is journaled in boxes or bearings 9 upon the upper sides of the side beams of the main frame.

10 designates the seed box or hopper, which is supported upon uprights or brackets 11 on the upper sides of the side beams 1. The seeding mechanism contained in said hopper is of ordinary construction, and is operated by a chain 12, running from the chain-wheel 13 on one end of the shaft 8 to a sprocket-wheel 14 upon one end of the shaft 15, which is journaled transversely in the hopper. Said seeding mechanism, however, forms no part of my invention and need not be described in detail. From the hopper the flexible tubes 16 convey the seed to the drills or furrow-openers 17. The latter are attached to arms or brackets 18, which are mounted pivotally upon a shaft 19, arranged transversely in the frame.

20 designates the shaft, which is mounted transversely in the main frame in rear of the brackets 11, supporting the seed-box. Said shaft is provided with segments 21, which are connected by chains 22 with the drill-tubes 17, which may thus by a partial revolution of the shaft 20 be simultaneously raised out of the ground. One end of the shaft 20 is also provided with a segment 23, which is connected by a suitable chain 24 and link-rod 25 with a hand-lever 26, by means of which the said shaft may be conveniently manipulated.

Upon the rear wall of the hopper is mounted a supplementary hopper 27, composed of a board or plank which is nailed or otherwise attached to triangular brackets 28 upon the rear walls of the hopper in such a manner as to leave a narrow slit or opening 29 between the lower edge of said plank and the rear walls of the hopper. Transversely through the supplemental hopper 27 extends a shaft 30, provided with radial fingers or agitators 31. Motion is transmitted to said shaft 30 by means of a chain 32, connecting a sprocket-wheel 33 on the end of said shaft with a chain-wheel 34 on one end of the roller-shaft 8.

The side pieces 1 of the frame are provided with boxes or bearings 35, in which are mounted the vertically-sliding bars 36, the downward movement of which is limited by the transverse pins 37. Suitably hinged to the lower ends of the said bars by means of transverse pins 38 are the harrow-sections 39, the meeting ends of which are connected or joined by means of a suitably-constructed hinge 40. Each of the harrow-sections is composed of two parallel bars 41, to which spring-teeth 42, of ordinary construction, are suitably secured. The harrow-sections are connected with the hound-frame 3 by means of draft-chains 43, and above the said harrow-sections, suitably journaled in the main frame, is a transverse shaft 44, having segments 45, which are connected with the harrow-sections by means of chains 46. The shaft 44 is also provided with a segment 47, connected by a chain 48 with the segment 23 on the shaft 20. It will thus be seen that by rocking or oscillating said shaft 20 in its bearings by means of the lever 26 the drill-tubes 17 and the harrow-sections 41 will be simultaneously braced from the ground, thus enabling the machine to be conveniently transported from place to place.

The operation of this invention and its advantages will be readily understood from the foregoing description, taken in connection with the drawings hereto annexed. It may be used with equal advantage for sowing grain or grass-seed, the teeth of the harrow serving to open the necessary furrows in the ground, while the roller serves to compress the earth and to cover the seeds.

It will be seen that the machine comprises in a single implement several devices which it has heretofore been customary to construct separately.

The general construction is simple and inexpensive, and the machine may be readily manipulated with satisfactory results.

Having thus described my invention, I claim—

1. The combination of the frame having the roller and the caster-wheel, the vertically-movable harrow composed of two sections hinged together at their meeting ends and connected at their outer ends to vertically-movable bars, a shaft arranged transversely above the harrow and having segments connected with the harrow-sections by chains, the hopper, the drill-tubes having brackets mounted pivotally upon a transverse shaft, a shaft arranged in rear of the hopper and having segments connected by chains with the drill-tubes, a segment upon the latter shaft connected by a chain with a segment upon the harrow-adjusting shaft, and an operating-lever connected by a link-rod and chain with a segment upon the shaft arranged in rear of the hopper, substantially as set forth.

2. The combination of the frame, the hopper, the drill-tubes having brackets mounted pivotally upon a transverse shaft, the harrow composed of two sections hinged together and provided at their upper ends with arms arranged to slide vertically in suitable bearings in the main frame, and mechanism for simultaneously raising or lowering the drill-tubes and the harrow-sections, substantially as set forth.

In testimony that I claim the foregoing as my own I have hereto affixed my signature in presence of two witnesses.

EDWIN T. COOMBS.

Witnesses:
D. W. BALDWIN,
S. B. LOVELACE.